United States Patent Office 3,558,660
Patented Jan. 26, 1971

3,558,660
**HALOVINYL-SUBSTITUTED SATURATED-CAR-
BOXYLIC ACIDS AND ANHYDRIDES**
Louis Schmerling, Riverside, Ill., assignor to Universal
  Oil Products Company, Des Plaines, Ill., a corporation
  of Delaware
No Drawing. Continuation-in-part of application Ser. No.
  668,672, Aug. 18, 1967, which is a continuation-in-part
  of abandoned application Ser. No. 577,140, Sept. 6,
  1966, which in turn is a continuation-in-part of abandoned
  application Ser. No. 260,849, Feb. 23, 1963. This
  application Nov. 19, 1969, Ser. No. 878,234
            Int. Cl. C07c 61/16
U.S. Cl. 260—346.3                       6 Claims

ABSTRACT OF THE DISCLOSURE

Chlorovinylation of aliphatic and cycloaliphatic carboxylic acids by condensation thereof with polychloroolefins. The products resulting therefrom are useful as chemical intermediates for the production of insecticides, flame retardants and resins.

---

This application is a continuation-in-part of my copending application, Ser. No. 668,672 filed Aug. 18, 1967, which is a continuation-in-part of copending application, Ser. No. 577,140 filed Sept. 6, 1966, which is a continuation-in-part of copending application, Ser. No. 260,849 filed Feb. 23, 1963, all of which prior applications are now abandoned.

This invention relates to a process for the halovinylation of saturated carboxylic acids. More specifically, the invention is concerned with a process for the chlorovinylation of aliphatic carboxylic acids and cycloaliphatic carboxylic acids, and to the products resulting therefrom. The term "carboxylic acids" as used in the present specification and appended claims will refer to both monocarboxylic acids and polycarboxylic acids, particularly the dicarboxylic acids.

It has now been discovered that saturated carboxylic acids, both aliphatic and cycloaliphatic in configuration, including monocarboxylic, dicarboxylic and anhydrides thereof, may be chlorovinylated by condensing polychloroolefins with the aforesaid carboxylic acids or anhydrides thereof in the presence of certain catalytic compositions of matter to prepare the desired products. This chlorovinylation is entirely novel and unexpected inasmuch as the carboxyl group or groups might well have prevented the reaction of the present process. The mere fact that the prior art shows that cycloalkanes can be chlorovinylated is no basis for predicting that cycloalkanecarboxylic acids could also be chlorovinylated. The two types of compounds show different reactivities in many condensation reactions. For example, cycloalkanes are ring-alkylated when treated with olefins in the presence of acidic catalysts such as sulfuric acid or aluminum chloride. In contradistinction to this cycloalkanecarboxylic acids are not ring-alkylated when treated with olefins in the presence of the same catalysts; there will be either no condensation at all or an esterification may occur, such esterification reaction involving the hydrogen atom attached to the oxygen atom rather than one of the hydrogen atoms attached to a ring-carbon atom. Furthermore, the prior art also shows a relative ease of extraction of hydrogen from various compounds using, for example, a t-butoxy free radical. This prior art indicates that the abstraction of hydrogen from carboxycyclohexane occurs at about one-fourth the rate of abstraction from cyclohexane (the ratio of hydrogen abstraction to the loss of methyl from the t-butoxy radical being 0.507:1.87) only one substance, namely, nitrocyclohexane losing hydrogen less readily, that is, a ratio of 0.507:0.329. In addition, cyanocyclohexane is also poorly reactive, the ratio being only slightly higher than that of carboxycyclohexane, namely, 0.507:0.587. Neither nitrocyclohexane nor cyanocyclohexane readily undergo the chlorovinylation similar to that of the instant invention. Therefore, one skilled in the art would have expected that carboxycyclohexane would also not be active in the reaction of the present invention, it being totally unexpected that chlorovinylation of the carboxycyclohexane would occur. The mere fact that both hydrocarbons and carboxylic acids undergo hydrogen abstraction reactions with free radicals does not guarantee that the two types of compounds will behave similarly in free radical-induced reactions with the compounds of the present invention. Experimentation involving condensation of various types of compounds has disclosed that it is not possible to cause condensation of a polyhaloolefin such as polychloroethylene with cyano, amino and keto compounds. While hydrogen may be abstracted from said compounds and many other type of compounds by a free radical, there is no way of predicting whether the free radical formed from the compound will add to a particular reactant; furthermore, even if it does add to a particular reactant there is not assurance that the newly formed radical will continue a chain. Therefore, the mere fact that hydrocarbons undergo a certain reaction and that compounds containing hydrocarbon moieties undergo a similar reaction (i.e., one with the same reactant) does not mean that all type of reaction which occurs with hydrocarbons will also occur with the second type of compounds. For example, the free radical chlorination of hydrocarbons is well-known, as is the fact that alkyl chlorides, acyl chlorides, and esters also undergo free radical chlorination. On the other hand, of these compounds only alkanes undergo free radical-induced condensation with ethylene at a carbon-hydrogen linkage. Therefore, in view of the fact that it is impossible to predict catalytic reactions with certainty (a free radical-induced reaction being catalytic), it was not possible to conclude that polychloroethylenes which chlorovinylate saturated hydrocarbons would also chlorovinylate aliphatic and cycloaliphatic carboxylic acids. Contrary to this, in view of the prior art, a predication might have been made that the reaction of a polychloroolefin with a saturated carboxylic acid such as an aliphatic carboxylic acid or a cycloaliphatic carboxylic acid would result in little or no condensation on a nuclear carbon atom to yield a chlorovinyl-substituted aliphatic carboxylic acid or cycloaliphatic carboxylic acid; formation of a chlorinated ester might have seemed a more probable product.

In contradistinction to what has been taught in the prior art, it has now been discovered that when a saturated carboxylic acid is reacted with a polychloroolefin of the type hereinafter set forth in greater detail in the presence of certain catalytic compositions of matter, the resultant compound will comprise a chlorovinyl-substituted carboxylic acid in which, in the case of an aliphatic carboxylic acid, the chlorovinyl-substituent will usually be on a carbon atom in α-position to the carboxyl group. However, when the saturated carboxylic acid is cycloaliphatic in nature, the chlorovinyl substituent will be chiefly on a carbon atom in the ring other than the tertiary carbon atom containing the carboxyl group.

For the reaction of the present invention to occur, two features are necessary: (1) a hydrogen atom must be extractable from the carboxylic acid by a free radical and (2) the resulting carboxylic free radical must condense with the chlorinated olefinic double bond. As shown by the prior art, electronic effects make the first of these two features quite slow, while both electronic and steric effects might have prevented the second; hence it was impossible to predict that the chlorovinylation of the carboxy alkane would occur and therefore totally unexpected that chlorovinylation of the acid did, in fact, take place.

The chlorovinylated carboxylic acids which are prepared according to the process of this invention are useful as intermediates in the preparation of other compounds which find a wide variety of uses in the chemical field. For example, the chlorovinylated aliphatic carboxylic acids and the chlorovinylated cycloaliphatic carboxylic acids may be condensed with other polychloro-containing compounds such as hexachlorocyclopentadiene to yield compositions of matter which possess insecticidal activity. As a specific example of this, 2-methyl-2-(2-chlorovinyl)pentanoic acid is condensed with hexachlorocyclopentadiene in a Diels-Alder reaction to form 2-methyl-2-(1,3,4,5,6,7,7-heptachloro - 5 - norbornen-2-yl) pentanoic acid, this compound possessing insecticidal activity, particularly against houseflies. In addition to possessing insecticidal activity, this compound will also possess the added physical characteristic of flame retardancy whereby it may be utilized as a component or additive in plastics, resins, or other polymeric compositions of matter such as polyesters, ABS resins, polyurethanes, epoxides, etc. to impart flame retardant properties to the finished compositions of matter. Likewise, the chlorovinylated cycloalkanecarboxylic acids which are prepared according to the process of this invention may be utilized as intermediates to form poly-functional compounds such as aldehyde acids and dicarboxylic acids. These compounds may be thereafter used as intermediates in the preparation of resins. A specific example of this would be the utilization of 4-(2,2-dichlorovinyl)cyclohexanecarboxylic acid which is hydrolyzed with water at an elevated temperature in the presence of a metallic compound such as magnesium oxide to prepare p-cyclohexanedicarboxylic acid. This latter compound is then reacted with ethylene glycol to form synthetic fibers. Fibers of this type may be modified by the addition of aromatic amines to promote the dyeability and thus obviate the necessity for using pressure or carriers which are usualy required when utilizing disperse dyes.

It is therefore an object of this invention to provide a process for the halovinylation of carboxylic acids.

A further object of this invention is to provide a process for the chlorovinylation of aliphatic carboxylic acids and cycloaliphatic carboxylic acids.

In one aspect an embodiment of this invention resides in a process for the chlorovinylation of a saturated carboxylic acid which comprises condensing said acid with a polychloroolefin containing at least one chlorine atom attached to each of the doubly-bonded carbon atoms in the presence of an organic peroxide at a temperature at least as high as the decomposition temperature of said peroxide, and recovering the resultant chlorovinylated saturated carboxylic acid.

Another embodiment of this invention is found in a chlorovinyl-substituted cycloalkanecarboxylic acid or anhydride thereof having the formulae:

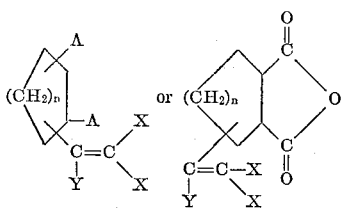

in which A is COOH or hydrogen, at least one A being COOH, X is hydrogen or chlorine, at least one X being chlorine, Y is hydrogen, except when both X's are chlorine Y may be hydrogen or chlorine, and $n$ is an integer of from 1 to 8.

A specific embodiment of this invention is found in a process for the chlorovinylation of cyclohexane carboxylic acid which comprises condensing said acid with dichloroethylene in the presence of di-t-butyl peroxide at a temperature in the range of from about 130° to about 140° C., and recovering the resultant (2-chlorovinyl)cyclohexane carboxylic acid.

Another specific embodiment of this invention resides in a (2,2-dichlorovinyl)cyclohexane-1,2-dicarboxylic acid.

Other objects and embodiments will be found in the following further detailed description of the present invention.

As hereinbefore set forth the present invention is concerned with the unexpected discovery that saturated carboxylic acids of the aliphatic and cycloaliphatic type, either monocarboxylated or polycarboxylated, may be halovinylated and particularly chlorovinylated by condensing a polyhaloolefin, particularly a polychloroolefin which contains at least one chlorine atom on each of the doubly-bonded carbon atoms with the predetermined acid in the presence of certain catalytic compositions of matter at reaction conditions hereinafter set forth in greater detail.

Examples of saturated carboxylic acids which may be utilized in the process of this invention include aliphatic monocarboxylic acids and aliphatic polycarboxylic acids such as acetic acid, propionic acid, butyric acid, 2-methylbutyric acid, valeric acid, 2-methylvaleric acid, 2-ethylvaleric acid, caproic acid, 2-methylcaproic acid, 3-methylcaproic acid, oenanthylic acid, 2-methyloenanthylic acid, 3-methylcaprylic acid, caprylic acid, 2-methylcaprylic acid, 3-methylcaprylic acid, 4-methylcaprylic acid, 2-ethylcaprylic acid, 3-ethylcaprylic acid, palargonic acid, 2-methylpelargonic acid, 3-methylpelargonic acid, 2-ethylpelargonic acid, 3-ethylpelargonic acid, etc., capric acid, 2-methylcapric acid, 3-methylcapric acid, 2-ethylcapric acid, 3-ethylcapric acid, etc. succinic acid, succinic anhydride, glutaric acid, glutaric anhydride, adipic acid, pimelic acid, suberic acid, azelaic acid, sebacic acid, etc.: cycloaliphatic monocarboxylic and cycloaliphatic polycarboxylic acids containing from about 5 to about 12 carbon atoms in the ring such as cyclopentanecarboxylic acid,
cyclohexanecarboxylic acid,
cycloheptanecarboxylic acid,
cyclooctanecarboxylic acid,
cyclononanecarboxylic acid,
cyclodecanecarboxylic acid,
cycloundecanecarboxylic acid,
1-methylcyclopentanecarboxylic acid,
2-methylcyclopentanecarboxylic acid,
3-methylcyclopentanecarboxylic acid,
2-ethylcyclopentanecarboxylic acid,
3-ethylcyclopentanecarboxylic acid,
1-methylcyclohexanecarboxylic acid,
3-methylcyclohexanecarboxylic acid,
4-methylcyclohexanecarboxylic acid,
2-ethylcyclohexanecarboxylic acid,
3-ethylcyclohexanecarboxylic acid,
2-methylcycloheptanecarboxylic acid,
3-methylcycloheptanecarboxylic acid,
4-methylcycloheptanecarboxylic acid,
2-ethylcycloheptanecarboxylic acid,
3-ethylcycloheptanecarboxylic acid,
2-methylcyclooctanecarboxylic acid,
3-methylcyclooctanecarboxylic acid,
4-methylcyclooctanecarboxylic acid,
2-ethylcyclooctanecarboxylic acid,
3-ethylcyclooctanecarboxylic acid, etc.,
cyclopentane-1,2-dicarboxylic anhydride,
cyclohexane-1,2-dicarboxylic acid,
cyclohexane-1,2-dicarboxylic anhydride,
cycloheptane-1,2-dicarboxylic acid,
cycloheptane-1,2-dicarboxylic anhydride,
cyclooctane-1,2-dicarboxylic acid, cyclooctane-1,2-dicarboxylic anhydride,
cyclononane-1,2-dicarboxylic acid,
cyclononane-1,2-dicarboxylic anhydride,
cyclodecane-1,2-dicarboxylic acid,
cyclodecane-1,2-dicarboxylic anhydride,
cyclopentane-1,3-dicarboxylic acid,
cyclohexane-1,3-dicarboxylic acid,
cyclohexane-1,4-dicarboxylic acid,
cycloheptane-1,3-dicarboxylic acid,
cycloheptane-1,4-dicarboxylic acid,
cyclooctane-1,3-dicarboxylic acid,
cyclooctane-1,4-dicarboxylic acid, etc.

It is also contemplated within the scope of this invention that cycloalkyl alkylcarboxylic acids such as cyclohexaneacetic acid, cyclohexanepropionic acid, cyclohexanebutyric acid, 2-cyclohexylpropionic acid, 2-methyl-2-cyclohexylpropionic acid, cycloheptanepropionic acid, 2-methylcycloheptanepropionic acid, etc., may also be used, although not necessarily with equivalent results.

The acids are characterized in that each contains at least one hydrogen atom attached to at least one carbon atom. It is generally preferred that said carbon atom be in α-position to a carboxyl group.

The polyhaloolefins and particularly the polychloroolefins which contain at least one chlorine atom attached to each of the doubly-bonded carbon atoms which are condensed with the aforementioned carboxylic acids according to the process of this invention include cis- and trans-dichloroethylene, trichloroethylene, tetrachloroethylene, 1,2-dichloro-1-propene, 1,2,3-trichloro-1-propene, 1,1,2-trichloro-1-propene, 1,2,3,3 - tetrachloro-1-propene, 1,2-dichloro-1-butene, 1,2,3 - trichloro-1-butene, 1,2,4,4-tetrachloro-1-butene, 2,3 - dichloro - 2 - butene, 1,2,3-trichloro - 2 - butene, 1,1,2,3 - tetrachloro-2-butene, 1,2-dichloro-1-pentene, 1,1,2-trichloro - 1 - pentene, 1,2,3 - trichloro-1-pentene, 1,2,5,5-tetrachloro-1-pentene, 2,3 - dichloro-2-pentene, 1,2,3-trichloro-2-pentene, 1,1,2,3-tetrachloro-2-pentene, etc. It is also contemplated within the scope of this invention that polychloroolefins containing halogen atoms in addition to a chlorine atom attached to each of the doubly-bonded carbon atoms may also be utilized. Examples of these compounds include 1,2-difluoro-1,2-dichloroethylene,
1,2-dichloro-3-fluoro-1-propene,
1,2-dichloro-3,3-difluoro-1-propene,
1,2-dichloro-3,3,3-trifluoro-1-propene,
1,2-dichloro-3-bromo-1-propene,
1,2-dichloro-3,3-dibromo-1-propene,
1,2-dichloro-3,3,3-tribromo-1-propene,
1,2-dichloro-3-fluoro-1-butene,
1,2-dichloro-3,3-difluoro-1-butene,
1,2-dichloro-4,4,4-trifluoro-1-butene,
1,2-dichloro-3-bromo-1-butene,
1,2-dichloro-3,3-dibromo-1-butene,
1,2-dichloro-4,4,4-tribromo-1-butene,
1-fluoro-1,2-dichloro-1-butene,
1,1-difluoro-2,3-dichloro-2-butene,
1,1,4,4-tetrafluoro-2,3-dichloro-2-butene,
1-bromo-1,2-dichloro-1-butene,
1,1-dibromo-2,3-dichloro-2-butene,
1,1,4,4-tetrabromo-2,3-dichloro-2-butene, etc.

The use of these compounds is permissible inasmuch as fluorine or bromine atoms in such compounds do not noticeably effect the activity of the chlorine atoms. Likewise, one or more fluorine or bromine atoms may be attached to the doubly-bonded carbon atoms provided that the aforementioned requirement of having a chlorine atom attached to each of the doubly-bonded carbon atoms is met. It is to be understood that the aforementioned polychloroolefins and carboxylic acids are only representative of the class of compounds which may be used and that the process of this present invention is not necessarily limited thereto.

As hereinbefore set forth, the process of the present invention is effected in the presence of certain catalytic compositions of matter, said catalysts comprising organic peroxides which are designated as free radical generating catalysts. Examples of these catalysts which may be used include in particular the di-substituted hydrogen peroxides such as di-t-butyl peroxide, t-butyl perbenzoate, benzoyl peroxide, etc. It is contemplated within the scope of this invention that hydroperoxides such as acetyl hydroperoxide, t-butyl hydroperoxide, may also be used, although not necessarily with equivalent results.

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely, the chloro-substituted alkene and the carboxylic acid, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts. Thus it is within the skill of one familiar with the art to select the particular temperature needed for any particular catalyst. However, the operating temperatures generally do not exceed the decomposition temperature of the catalyst by more than about 150° C. since free radical generating catalysts decompose rapidly under such conditions. For example, when a free radical generating catalyst such as t-butyl perbenzoate is used having a decomposition temperature of approximately 115° C., the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of condensation reaction between the polychloroolefin and the saturated carboxylic acid. However, the increased rate of reaction is accompanied by certain amounts of decomposition. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure withstanding equipment to insure liquid phase conditions. In batch type operations, it is often desirable to utilize pressure withstanding equipment to charge the reactants and catalyst to the vessel, and to pressure the vessel with 10, or 30 or 50 or more atmospheres with an inert gas such as nitrogen. This helps to insure the presence of liquid phase conditions. However, when the mole quantity of reactants is sufficient, the pressure which they themselves generate at the temperature utilized is sunfficient to maintain the desired phase conditions. Furthermore, the concentration of the catalyst employed in this process may vary over a rather wide range such as from about 0.1% to about 10% of the total weight of the combined starting materials charged to the process. The reaction time may be within the range of less than one minute to several hours, depending upon temperature and half life of the catalyst. Generally speaking, contact times of at least 10 minutes are preferred.

The process of this invention may be effected in any suitable manner and may comprise either a batch or continuous type operation. For example, when a batch type operation is used, a quantity of the starting materials comprising the saturated carboxylic acid and the polychloroolefin of the type hereinbefore set forth, are placed in a condensation apparatus along with the particular organic peroxide which has been chosen as the catalyst. A particularly suitable type of apparatus for this reaction comprises a rotating autoclave. The reactants are sealed in the autoclave, and an inert gas such as nitrogen pressed in until the desired pressure has been reached. The reaction vessel and contents thereof are then heated to the desired temperature which is at least as high as the decomposition temperature of the organic peroxide and preferably not greater than 150° C. higher than said decomposition temperature. It is noted at this time that the amount of pressure which is used may be that which is sufficient to maintain a major portion of the reactants in the liquid phase. Upon completion of the desired residence time, the vessel and contents thereof are allowed to cool to room temperature, the excess pressure, if any, is vented and the reaction products are recovered. The reaction product is then treated by neutralization with an alkali, extraction with ether, followed by fractional distillation, usually under reduced pressure. The desired reaction product comprising the chlorovinylated carboxylic acid is separated and recovered therefrom.

It is also contemplated within the scope of this invention that the process described herein may be effected in a continuous manner of operation. When such a procedure is used, the starting materials comprising the carboxylic acid and the polychloroolefin are continuously charged to a reaction zone which is maintained at the proper operating conditions of temperature and pressure. In addition, the particular organic peroxide catalyst is also continuously charged thereto. The reactants may be charged through separate lines or, if so desired, may be admixed prior to entry into said reactor and passed therethrough in a single stream. Upon completion of the desired residence time the reactor effluent is continuously withdrawn, the reaction products are separated from any unreacted starting materials, which may be recycled to form a portion of the feed stock, and subjected to treatment similar to that hereinbefore set forth whereby the desired reaction product comprising the chlorovinylated carboxylic acid is separated and recovered.

Examples of chlorovinylated carboxylic acids which may be prepared according to the process of this invention include chlorovinyl-substituted aliphatic carboxylic acids such as 2-(2-chlorovinyl)propionic acid, 2-(2,2-dichlorovinyl)propionic acid, 2 - (1,2,2 - trichlorovinyl) propionic acid, 2 - (2 - chlorovinyl)butyric acid, 2-(2,2-dichlorovinyl)butyric acid, 2 - (1,2,2 - trichlorovinyl) butyric acid, 2 - (2 - chlorovinyl)pentanoic acid, 2 - (2,2-dichlorovinyl)pentanoic acid, 2 - (1,2,2 - trichlorovinyl) pentanoic acid, 2 - (2 - chlorovinyl)caproic acid, 2-(2,2-dichlorovinyl)caproic acid, (2 - chlorovinyl)succinic acid, (2 - chlorovinyl)succinic anhydride, (2,2 - dichlorovinyl) glutaric acid, (2,2 - dichlorovinyl)glutaric anhydride, (1, 2,2 - trichlorovinyl)adipic acid, (2 - chlorovinyl)pimelic acid, (2,2 - dichlorovinyl)suberic acid, (1,2,2 - trichlorovinyl)-azelaic acid, (2,2 - dichlorovinyl)sebacic acid, etc.

In addition, chlorovinyl-substituted cycloalkanemonocarboxylic and dicarboxylic acids or anhydrides thereof comprising new compositions of matter possessing the formulae:

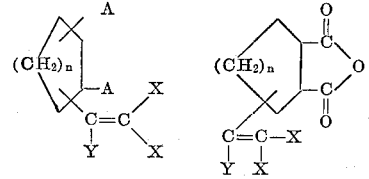

in which A is COOH or hydrogen, at least one A being COOH, X is hydrogen or chlorine, at least one X being chlorine, Y is hydrogen, except when both X's are chlorine Y may be hydrogen or chlorine, and $n$ is an integer of from 1 to 8 which may be prepared include (2-chlorovinyl)cyclopentanecarboxylic acids,
(2,2-dichlorovinyl)cyclopentanecarboxylic acids,
(1,2,2-trichlorovinyl)cyclopentanecarboxylic acids,
(2-chlorovinyl)cyclohexanecarboxylic acids,
(2,2-dichlorovinyl)cyclohexanecarboxylic acids,
(2-chlorovinyl)cycloheptanecarboxylic acids,
(2,2-dichlorovinyl) cycloheptanecarboxylic acids,
(1,2,2-trichlorovinyl)cycloheptanecarboxylic acids,
(2-chlorovinyl)cyclooctanecarboxylic acids,
(2,2-dichlorovinyl)cyclooctanecarboxylic acids,
(1,2,2-trichlorovinyl)cyclooctanecarboxylic acids,
(2-chlorovinyl)cyclononanecarboxylic acids,
(2,2-dichlorovinyl)cyclononanecarboxylic acids,
(1,2,2-trichlorovinyl)cyclononanecarboxylic acids,
(2-chlorovinyl)cyclodecanecarboxylic acids,
(2,2-dichlorovinyl)cyclodecanecarboxylic acids,
(1,2,2-trichlorovinyl)cyclodecanecarboxylic acids
(2-chlorovinyl)cycloundecanecarboxylic acids,
(2,2-chlorovinyl)cycloundecanecarboxylic acids,
(1,2,2-trichlorovinyl)cycloundecanecarboxylic acids,
(2-chlorovinyl)cyclododecanecarboxylic acids,
(2,2-chlorovinyl)cylododecanecarboxylic acids,
(1,2,2-trichlorovinyl)cyclododecanecarboxylic acids, etc.,
(2-chlorovinyl)cyclopentane-1,2-dicarboxylic acids,
(2-chlorovinyl)cyclopentane-1,2-dicarboxylic anhydrides,
(2,2-dichlorovinyl)cyclopentane-1,2-dicarboxylic acids,
(2,2-dichlorovinyl)cyclopentane-1,2-dicarboxylic anhydrides,
(1,2,2-trichlorovinyl)cyclohexane-1,2-dicarboxylic acids,
(1,2,2-trichlorovinyl)cyclohexane-1,2-dicarboxylic anhydrides,
(2-chlorovinyl)cycloheptane-1,3-dicarboxylic acid,
(2,2-dichlorovinyl)cyclooctane-1,2-dicarboxylic acids,
(1,2,2-trichlorovinyl)cyclononane-1,3-dicarboxylic acids,
(2,2-dichlorovinyl)cyclodecane-1,2-dicarboxylic acids, etc.

It is to be understood that the aforementioned compounds are only representative of the class of compounds which may be prepared, and that the process of this invention is not necessarily limited thereto.

It is significant that the products which may be prepared according to the process of this invention by condensing a polychloroolefin with an unsubstituted cycloalkanecarboxylic acid comprise products in which the substitution occurs chiefly at a secondary carbon atom in the ring rather than at the tertiary α-carbon atom. This is unexpected in view of the fact that hydrogen attached to a tertiary α-carbon atom is usually more readily abstracted than a hydrogen atom which is attached to one of the other secondary carbon atoms in the cycloaliphatic ring, such abstraction being the first step in the condensation reaction of this invention. The aforementioned configuration of the products was verified, as hereinafter set forth in greater detail, by nuclear magnetic resonance analyses.

The following examples are given to illustrate the process of the present invention which, however, are not intended to limit the generally broad scope of the present invention in strict accordance therewith.

EXAMPLE I

A mixture of 101 g. of 2-methylpentanoic acid, 50 g. of trans-dichloroethylene and 8 g. of di-t-butyl peroxide was placed in the glass liner of a rotating autoclave, said liner then being sealed into the autoclave. Nitrogen was pressed in until an initial pressure of 30 atmospheres was reached following which the autoclave and contents thereof were heated to a temperature of about 130° C. and maintained in a range of from about 130° to about 140° C. for a period of 5 hours. At the end of this time the autoclave and contents thereof were allowed to cool to room temperature, the excess pressure was vented and the reaction product comprising 159 g. of dark amber liquid was recovered. The product was made alkaline with sodium hydroxide and extracted with ether to remove unreacted dichloroethylene and other alkali-insoluble material. The aqueous solution from which the ether extract was separated was acidified and then extracted with ether again. This ether extract was subjected to fractional distillation. A cut boiling in the range of from 86° to 90° C. at 0.4 mm. pressure was recovered. The cut had a refractive index $$n\frac{23}{D}$$

of 1.4575. Titration of this cut with alkali consumed 5.71 meq./g. indicating a molecular weight of 175.1 while that calculated for 2-methyl-2-(2-chlorovinyl)pentanoic acid is 176.6.

EXAMPLE II

A mixture of 100 g. of 2-methylbutyric acid, 50 g. of trichloroethylene and 8 g. of di-t-butyl peroxide was sealed in the rotating autoclave and nitrogen pressed in until an initial pressure of 30 atmospheres was reached. The autoclave was heated and maintained at a temperature in the range of from 130° to 140° C. for a period of 4 hours, the maximum pressure during this time reaching 45 atmospheres. At the end of this time, the autoclave and contents thereof were allowed to cool to room temperature, and excess pressure vented, the autoclave was opened and the reaction product comprising 158 g. of dark amber liquid was recovered. The product was taken up in ether, washed with water, dried and distilled. The bottoms from the distillation were dissolved in a 10% sodium hydroxide solution and the alkaline solution was thereafter extracted with ether allowing an extract from which 10.5 g. of residue was recovered after distilling off the ether. The alkaline solution was acidified with hydrochloric acid and again extracted with ether. Distillation of the extract under reduced pressure resulted in recovering a cut boiling in the range of from 85° to 100° C. at 0.4 mm. pressure, said cut having a refractive index $$n\frac{23}{D}$$

of 1.4758. The molecular weight of this cut was determined by titration with alkali which consumed 5.46 meq./g. indicating a molecular weight of 183.2 while that calculated for 2-methyl-2-(2,2-dichlorovinyl)butyric acid is 197.0. The cut was also analyzed with the following results: Calculated for 2-methyl-2-(2,2-dichlorovinyl)butyric acid (percent): C, 42.66; H, 5.12; Cl, 35.99. Found (percent): C, 44.26; H, 5.47; Cl, 31.0.

EXAMPLE III

A mixture of 74 g. (1.0 mole) of propionic acid, 65 g. (0.49 mole) of trichloroethylene and 10 g. of di-t-butyl peroxide was placed in the glass liner of a rotating autoclave. The liner was sealed in the autoclave and nitrogen pressed in until an initial pressure of 30 atmospheres was reached. The autoclave and contents thereof were heated to a temperature of 130° C. and maintained in a range of from 130° to about 140° C. for a period of 5.3 hours during which time the maximum pressure rose to 50 atmospheres. At the end of this time, the autoclave and contents thereof were allowed to cool to room temperature, the final pressure at room temperature being 30 atmospheres. The excess pressure was vented, the autoclave was opened and the reaction product comprising 148 g. of dark amber liquid was recovered. The product was treated in a manner similar to that set forth in the above examples with the final ether extraction being subjected to fractional distillation under reduced pressure. The cut boiling at 95° to 119° C. at 13 mm. pressure was recovered. Nuclear magnetic resonance analysis of this cut indicated that the material comprised 2-(2,2-dichlorovinyl)propionic acid.

EXAMPLE IV

A mixture of 50 g. (0.39 mole) of cyclohexanecarboxylic acid, 50 g. (0.52 mole) of cis-dichloroethylene and 6 g. of di-t-butyl peroxide was placed in the glass liner of a rotating autoclave. The autoclave was sealed and nitrogen pressed in until an initial pressure of 30 atmospheres was reached. The autoclave and contents thereof were heated and maintained at a temperature in the range of from 130° to 140° C. for a period of 4 hours, the maximum pressure rising to 52 atmospheres. At the end of this time, the autoclave and contents thereof were allowed to cool to room temperature, the final pressure being 30 atmospheres. The excess pressure was vented, the autoclave was opened and 98 g. of product was recovered. The product was treated in a manner similar to that set forth in the above examples, that is, by fractionally distilling the product, recovering cuts boiling at from 235° to 305° C., treating the combined cuts with 20% sodium hydroxide solution, extracting with ether, acidifying the residue after evaporation of the ether, further extracting with ether and subjecting the residue to fractional distillation under reduced pressure. The cut boiling at 112° to 116° C. at 0.4 mm. pressure had a refractive index $$n\frac{22}{D}$$

of 1.4991. Titration of this cut for acidity gave 5.32 meq. of alkali per gram which is equivalent to a molecular weight of 187.9. The molecular weight which is calculated for (2-chlorovinyl)cyclohexanecarboxylic acid is 188.7. In addition, the cut was analyzed with the following results: Calculated for (2-chlorovinyl)cyclohexanecarboxylic acid (percent): Cl, 18.80. Found (percent): Cl, 18.9. The nuclear magnetic resonance spectrum of the cut indicated that the material had the following structure:

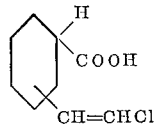

EXAMPLE V

A mixture of 66 g. (0.52 mole) of cyclohexanecarboxylic acid, 50 g. (0.38 mole) of trichloroethylene and 8 g. of di-t-butyl peroxide was treated in a manner similar to that hereinbefore set forth. The reaction product which comprises 122 g. of product was also treated in a manner similar to that set forth in the above examples. After fractional distillation under reduced pressure, the cut boiling at 119°–123° C. at 0.2 mm. pressure was recovered, said cut having a refractive index $$n\frac{22}{D}$$

of 1.5128, said cut comprising 4-[or 2- or 3-, and little 1-]-(2,2-dichlorovinyl)cyclohexanecarboxylic acid, the structure which best fit the nuclear magnetic resonance spectrum. The molecular weight of this cut was 221.2 being determined by an alkali titration; the calculated molecular weight is 223.1. The chlorine analysis was 31.6% compared to 31.8% calculated.

EXAMPLE VI

A mixture of 70 g. (0.57 mole) of cyclohexanecarboxylic acid, 75 g. (0.45 mole) of tetrachloroethylene and 9 g. of di-t-butyl peroxide was treated in a manner similar to that in the above examples. Upon completion of the desired residence time, the reaction product which comprised 153 g. of liquid was treated in a manner similar to that hereinbefore set forth. After fractional distillation under reduced pressure, the cut boiling at 145° to 148° C. at 0.9 mm. pressure was recovered. The nuclear magnetic resonance spectrum of this cut indicated that it comprised (1,2,2-trichlorovinyl)cyclohexanecarboxylic acid.

EXAMPLE VII

In this example a mixture of 57 g. (0.5 mole) of cyclopentanecarboxylic acid, 50 g. (0.38 mole) of trichloroethylene and 8 g. of di-t-butyl peroxide is placed in the glass liner of a rotating autoclave. The liner is sealed in the autoclave and nitrogen is pressed in until an initial pressure of 30 atmospheres is reached. Thereafter, the autoclave and contents thereof are heated to a temperature of about 130° C. to about 140° C. for a period of 4 hours. At the end of this time, the autoclave and contents thereof are allowed to cool to room temperature, the excess pressure is vented, the autoclave is opened and the reaction product is recovered. The product is taken up in ether, washed with water, dried and subjected to fractional distillation under reduced pressure. The products from the distillation are treated in a manner similar to that set forth in Example I above and again subjected to fractional distillation under reduced pressure. The desired product comprising (2,2-dichlorovinyl)cyclopentanecarboxylic acid is recovered.

EXAMPLE VIII

A mixture of 106 g. (0.5 mole) of cyclododecanecarboxylic acid, 39 g. (0.4 mole) of cis-dichloroethylene and 8 g. of di-t-butyl peroxide is treated in a manner similar to that set forth in the above examples. Upon completion of the desired residence time in the autoclave, the reaction product is recovered and also treated in a manner similar to that hereinbefore set forth. After fractional distillation under reduced pressure, the desired product comprising (2-chlorovinyl)cyclododecanecarboxylic acid is recovered.

EXAMPLE IX

A mixture of 69 g. (0.40 mole) of cyclohexane-1,2-dicarboxylic acid, 163 g. (1.24 mole) of trichloroethylene and 8 g. of di-t-butyl peroxide is placed in the glass liner of a rotating autoclave. The autoclave is sealed and nitrogen pressed in until an initial pressure of 30 atmospheres was reached. The autoclave and contents thereof are thereafter heated and maintained at a temperature in the range of from about 130° to 140° C. for a period of 4 hours. At the end of this time, the autoclave and contents thereof are allowed to cool to room temperature, the excess pressure is vented and the autoclave is opened. The product is treated in a manner similar to that set forth in the above examples and the desired product comprising (1,2,2-trichlorovinyl)cyclohexane-1,2-dicarboxylic acid is recovered by fractional crystallization from water plus a minor amount of alcohol.

EXAMPLE X

In this example a mixture of 0.5 mole of cyclohexane-1,2-dicarboxylic anhydride and 1.0 mole of 1,1-dichloroethylene along with 6 g. of di-t-butyl peroxide is placed in the glass liner of a rotating autoclave. The autoclave is sealed and nitrogen is pressed in until an initial pressure of 30 atmospheres is reached. The autoclave and contents thereof are then heated to a temperature of about 130° C. and maintained at a temperature in the range of from about 130° to about 140° C. for a period of 4 hours. At the end of this time, the autoclave and contents thereof are allowed to cool to room temperature, the excess pressure is vented and the reaction product is recovered. This product is made alkaline utilizing a sodium hydroxide solution and is thereafter extracted with ether to remove unreacted dichloroethylene and other alkali-insoluble material. The aqueous solution from which the ether extract is separated is then acidified and again extracted with ether. The latter ether extract is subjected to fractional distillation and the desired product comprising a (2,2 - dichlorovinyl)cyclohexane - 1,2-dicarboxylic anhydride is separated and recovered.

EXAMPLE XI

A mixture of 70.5 g. (0.5 mole) of 2-methyl-2-(2-chlorovinyl)pentanoic acid and 136.5 g. (0.5 mole) of hexachlorocyclopentadiene along with 200 cc. of xylene is placed in an apparatus provided with heating, stirring and reflux means. The flask is heated to a temperature of 150° C. and maintained thereat for a period of 6 hours. At the end of this time, heating is discontinued, the flask and contents thereof are allowed to return to room temperature and the reaction mixture is recovered. The solvent is removed by vacuum and the remainder of the mixture is subjected to fractional distillation. The desired product comprising 2-methyl-2-(1,3,4,5,6,7,7-heptachloro-5-norbornen-2-yl)pentanoic acid is recovered, usually as the residue of the distillation. A solution is made by dissolving 1 g. of the thus prepared polychloro-substituted pentanoic acid in 10 cc. of benzene. The resultant solution is then admixed with 100 cc. of water using Triton-X100 as an emulsifying agent. The thus formed insecticidal composition of matter is sprayed into a cage containing houseflies and will cause a 100% knockdown.

EXAMPLE XII

In this example 112.5 g. (0.5 mole) of the product of Example V, 4-(2,2-dichlorovinyl)cyclohexanecarboxylic acid, is placed in a flask along with 200 cc. of water and 80 g. (2.0 mole) of magnesium oxide. The flask is heated to a temperature of 200° C. and maintained thereat for a period of 6 hours. At the end of this time heating is discontinued and the flask is allowed to cool to room temperature. The organic layer is separated from the aqueous layer, acidified, and the resulting organic product is subjected to fractional distillation whereby the desired p-cyclohexanedicarboxylic acid is recovered. This acid is then condensed with ethylene carbonate to form a precondensate which is thereafter condensed with a magnesium catalyst to form a polyester. Alternatively, the p-cyclohexanedicarboxylic acid is converted to a dimethyl ester by any method known to the art, and the dimethyl ester is then condensed with ethylene glycol to form a fibrous plastic.

I claim as my invention:

1. A chlorovinyl-substituted cycloalkanecarboxylic acid or anhydride thereof having the formula:

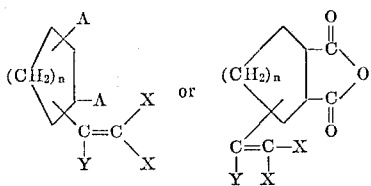

in which A is COOH or hydrogen, at least one A being COOH, X is hydrogen or chlorine, at least one X being chlorine, Y is hydrogen, except when both X's are chlorine Y may be hydrogen or chlorine, and $n$ is an integer of from 1 to 8.

2. The acid as set forth in claim 1 being a (2-chlorovinyl)cyclohexanecarboxylic acid.

3. The acid as set forth in claim 1 being a (2,2-dichlorovinyl)cyclohexanecarboxylic acid.

4. The acid as set forth in claim 1 being a (1,2,2-trichlorovinyl)cyclohexanecarboxylic acid.

5. The acid as set forth in claim 1 being a (2,2-dichlorovinyl)cyclohexane-1,2-dicarboxylic acid.

6. The acid as set forth in claim 1 being a (2,2-dichlorovinyl)cyclohexane-1,2-dicarboxylic anhydride.

References Cited

Schmerling et al.: J. Am. Chem. Soc., vol. 71, pp. 2015–19 (1949).

Brown et al.: J. Am. Chem. Soc., vol. 77 (1955), pp. 4019–24.

Patmore et al.: J. Org. Chem., vol. 27 (1962), pp. 4196–4200.

ALEX MAZEL, Primary Examiner

B. I. DENTZ, Assistant Examiner

U.S. Cl. X.R.

252—8.1; 260—539, 514; 424—317